United States Patent
Guering et al.

(10) Patent No.: US 10,640,195 B2
(45) Date of Patent: May 5, 2020

(54) METHOD FOR MANUFACTURING A THERMOACOUSTIC INSULATION MODULE FOR AN AIRCRAFT COMPRISING A BENDING STEP

(71) Applicant: Airbus Operations SAS, Toulouse (FR)

(72) Inventors: Bernard Guering, Montrabe (FR); Matthieu De Kergommeaux, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 359 days.

(21) Appl. No.: 15/847,078

(22) Filed: Dec. 19, 2017

(65) Prior Publication Data
US 2018/0194452 A1    Jul. 12, 2018

(30) Foreign Application Priority Data
Dec. 22, 2016   (FR) ...................................... 16 63217

(51) Int. Cl.
*B64C 1/40*    (2006.01)
*B64F 5/10*    (2017.01)
*B64C 1/06*    (2006.01)
*B64D 11/00*   (2006.01)

(52) U.S. Cl.
CPC .............. *B64C 1/406* (2013.01); *B64C 1/066* (2013.01); *B64C 1/068* (2013.01); *B64C 1/40* (2013.01); *B64C 1/403* (2013.01); *B64F 5/10* (2017.01); *B23P 2700/01* (2013.01); *B64D 2011/0046* (2013.01); *Y02T 50/46* (2013.01)

(58) Field of Classification Search
CPC ........... B64C 1/40; B64C 1/068; B64C 1/063; B64C 1/066; B64C 1/406; B64C 1/403; B64F 5/10; B64D 2011/0046; Y02T 50/46; B23P 2700/01
See application file for complete search history.

(56) References Cited

U.S. PATENT DOCUMENTS 8,127,889 B1 * 3/2012 Mathur ..................... B64C 1/40
                                                      181/290
2006/0054742 A1 * 3/2006 Druckman .............. B29C 53/66
                                                      244/118.5
(Continued)

FOREIGN PATENT DOCUMENTS

DE    102007050422    4/2009
FR    2961488    12/2011

OTHER PUBLICATIONS

French Search Report, dated Aug. 31, 2017, priority document.

*Primary Examiner* — Jermie E Cozart
(74) *Attorney, Agent, or Firm* — Greer, Burns & Crain, Ltd.

(57) ABSTRACT

In order to facilitate the thermoacoustic insulation of an aircraft portion, a method for manufacturing a thermoacoustic insulation module for an aircraft comprises a step of providing a mat configured to provide thermoacoustic insulation of an aircraft portion, followed by a step of attaching a bendable structure to the mat, followed by a step of bending the bendable structure, along a bending axis parallel to a longitudinal direction of the mat, such that the bendable structure forms a load-bearing structure supporting the mat in a curved shape.

10 Claims, 12 Drawing Sheets

(56) References Cited

U.S. PATENT DOCUMENTS

| | | |
|---|---|---|
| 2009/0090580 A1* | 4/2009 | Hotzeldt .................. B32B 3/20 |
| | | 181/290 |
| 2009/0250554 A1* | 10/2009 | Graeber .................. B64C 1/068 |
| | | 244/120 |
| 2010/0233424 A1* | 9/2010 | Dan-Jumbo .......... B29C 70/202 |
| | | 428/113 |
| 2010/0243807 A1* | 9/2010 | Hossain .............. B32B 37/1207 |
| | | 244/121 |
| 2011/0024565 A1 | 2/2011 | Koefinger et al. |
| 2012/0148824 A1* | 6/2012 | Martin .................. B29C 70/342 |
| | | 428/301.4 |
| 2017/0283031 A1* | 10/2017 | Borumand ............... A62C 3/08 |

* cited by examiner

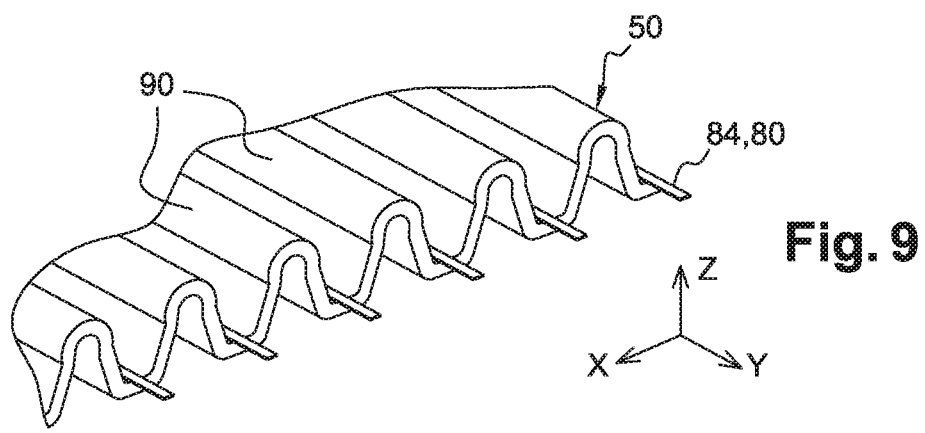
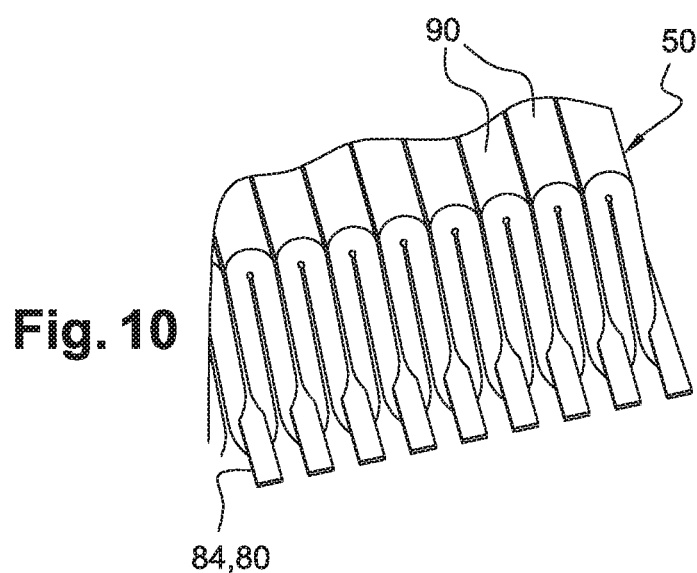
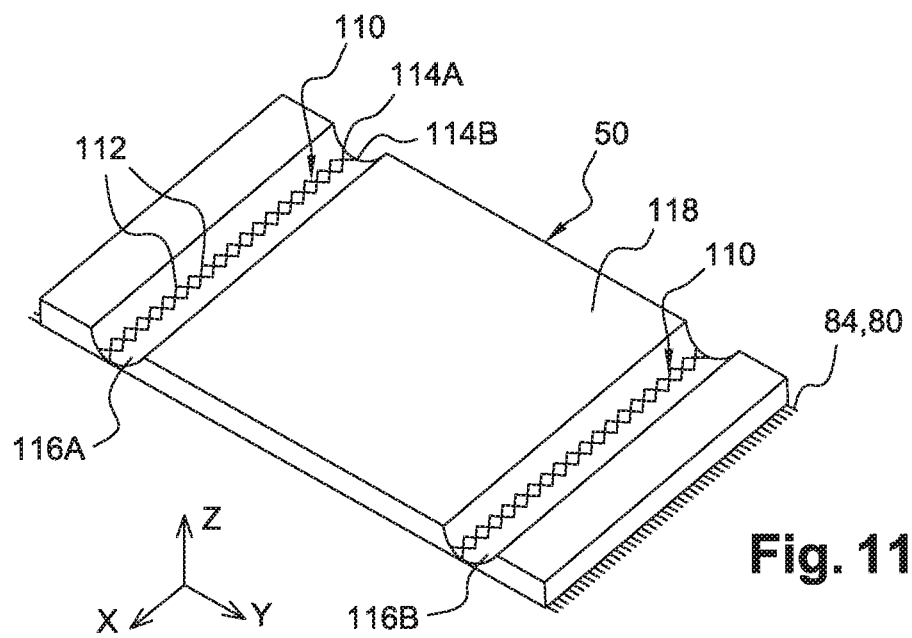

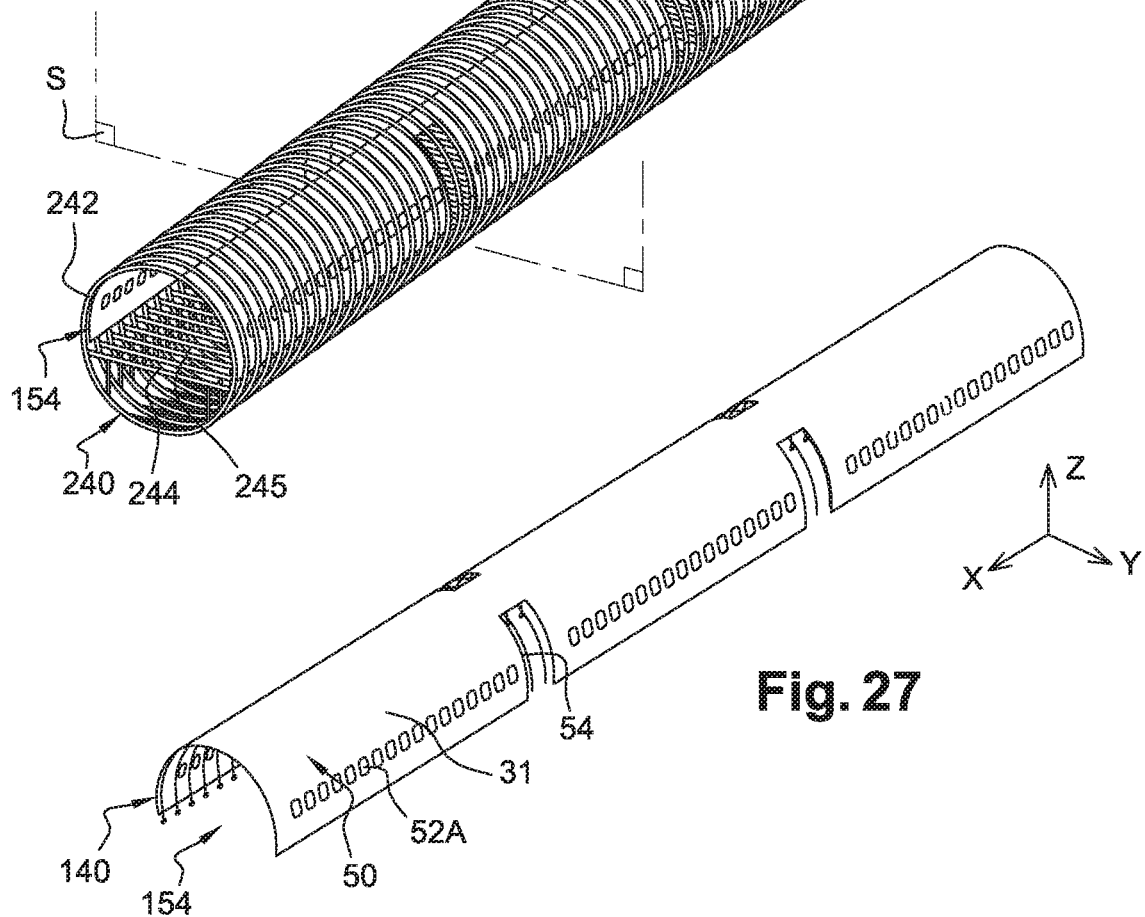
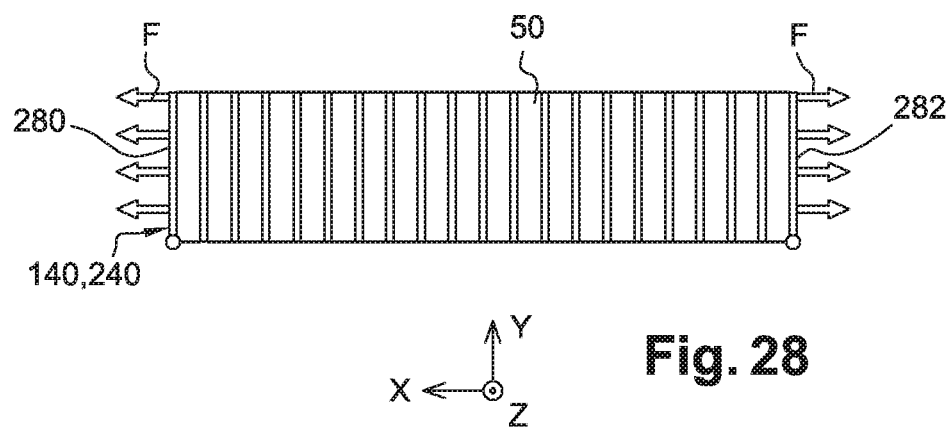

METHOD FOR MANUFACTURING A THERMOACOUSTIC INSULATION MODULE FOR AN AIRCRAFT COMPRISING A BENDING STEP

CROSS-REFERENCES TO RELATED APPLICATIONS

This application claims the benefit of the French patent application No. 1663217 filed on Dec. 22, 2016, the entire disclosures of which are incorporated herein by way of reference.

TECHNICAL FIELD

The present invention relates to the field of thermal and acoustic insulation systems for aircraft and has the general aim of improving the incorporation of these systems into aircraft, in particular into aircraft cabins.

More particularly, the invention concerns a method for manufacturing a thermoacoustic insulation module intended for the thermal and acoustic insulation of an aircraft.

BACKGROUND OF THE INVENTION

In an aircraft, the purpose of the thermal and acoustic insulation system, also referred to as "thermoacoustic insulation," is to insulate the aircraft from the noises, in particular the aerodynamic noises, and the cold encountered during flight at normal cruising altitudes. Generally, the insulation relates to the aircraft cabin, which is intended to accommodate the crew and passengers, whereas the hold generally is not insulated.

In known types of aircraft, the thermoacoustic insulation system for insulating the cabin comprises a plurality of padded panels, each assembled on the structure of the aircraft. A typical medium-haul aircraft therefore contains approximately three hundred padded panels. The geometry of these panels varies depending on their respective locations inside the aircraft, and they are generally produced for the most part manually and incorporated manually into the structure of the aircraft.

Operations for installing the thermoacoustic insulation system in the aircraft are therefore long and costly, and furthermore take over the aircraft, in that it is not generally possible to carry out other operations on the aircraft while the thermoacoustic insulation system is being installed.

In view of the increasing rates of aircraft production, it is therefore desirable to improve the methods used to incorporate thermoacoustic insulation systems into aircraft.

SUMMARY OF THE INVENTION

The idea underlying the invention comprises replacing a plurality of padded panels used to constitute a known type of thermoacoustic insulation system, with a single mat, the latter therefore having dimensions considerably larger than the dimensions of the padded panels used in the prior art.

This principle offers numerous advantages, including:

time saving when installing a thermoacoustic insulation system in an aircraft, such a saving being particularly advantageous because this operation is part of the critical path of aircraft assembly procedures;

significant weight saving (for example of the order of 15%), because the known types of insulation system require an overlap between their multiple adjacent panels;

money saving, in particular due to the possibility of automating much of the manufacture of the thermoacoustic insulation module, and due to the reduced time required to thermoacoustically insulate an aircraft by means of such a module;

improved efficiency in terms of thermoacoustic insulation, owing to a considerable reduction in leaks and thermal bridges, in particular as a result of the reduction in the number of edges.

In this context, the invention proposes a method for manufacturing a thermoacoustic insulation module for an aircraft, comprising at least:

a step of providing a mat intended for the thermoacoustic insulation of an aircraft portion; followed by a step of attaching a bendable structure to the mat; followed by a step of bending the bendable structure, along a bending axis parallel to a longitudinal direction of the mat, such that the bendable structure forms a load-bearing structure supporting the mat in a curved shape, the load-bearing structure and the mat together forming said thermoacoustic insulation module.

The manufacturing method according to the invention proposes to give such a mat a curved shape by using the bendable nature of a structure previously connected to the mat. The curved configuration of the mat in the thermoacoustic insulation module then helps facilitate the installation of the mat on an aircraft structure similar in shape.

The method according to the invention therefore offers a simple, economical and effective means for manufacturing a thermoacoustic insulation module comprising such a mat, offering advantageous options in terms of installation in an aircraft.

In preferred embodiments of the invention, the step of providing the mat comprises at least:

a step of providing a raw mat; followed by a step of producing the mat from the raw mat, comprising the production of a plurality of porthole openings and/or at least one aircraft cabin door opening in the raw mat.

Preferably, the step of providing the raw mat comprises a step of producing the raw mat comprising at least:

a step of depositing a first layer of thermoacoustic insulation on an outer film; followed by a step of depositing a second layer of thermoacoustic insulation on one or more first areas of the first layer of thermoacoustic insulation, leaving one or more second areas of the first layer of thermoacoustic insulation not covered by the second layer of thermoacoustic insulation; followed by a step of depositing an inner film on the second layer of thermoacoustic insulation and on the second areas of the first layer of thermoacoustic insulation.

In preferred embodiments of the invention, the bendable structure comprises bendable battens, the step of attaching the bendable structure to the mat comprising a step of attaching the bendable battens to the mat such that the bendable battens are arranged in a transverse direction of the mat orthogonal to the longitudinal direction, and spaced apart from each other in the longitudinal direction.

Preferably, the step of attaching the bendable structure to the mat comprises a step of attaching reversible attachment devices to the mat, followed by the step of attaching the bendable battens to the mat, by means of the reversible attachment devices.

Preferably, the method further comprises a step of attaching feet respectively to two opposing ends of each of the bendable battens, the feet being provided with wheels and/or lifting actuators.

Preferably, the method comprises, between the step of attaching the bendable battens to the mat and the step of bending the bendable structure, a step of compacting the mat that comprises at least:

raising the segments of the mat each situated between two corresponding consecutive bendable battens, in such a way as to give the mat an undulated shape in the longitudinal direction; and bringing the segments closer together, and moving the bendable battens closer together, by compressing the segments, in such a way as to reduce the space requirement of the mat in the longitudinal direction.

Preferably, the method further comprises a step of connecting the bendable battens to at least one synchronization device, connecting the bendable battens to each other in such a way as to synchronize the movements of the bendable battens relative to each other in the longitudinal direction.

Preferably, the method further comprises a step of installing a longitudinal retaining device configured to prevent the bendable battens from moving apart from each other in the longitudinal direction.

In preferred embodiments of the invention, the method further comprises a step of installing a transverse retaining device configured to hold the load-bearing structure in its bent shape.

BRIEF DESCRIPTION OF THE DRAWINGS

The invention will be more clearly understood, and other details, advantages and features of the invention will become apparent, upon reading the description below provided as a non-limiting example, with reference to the appended drawings in which:

FIGS. 9 and 10 are schematic perspective views of at least a portion of the mat and the bendable battens, showing a step of compacting the mat;

FIG. 11 is a partial schematic perspective view of the mat and the bendable battens, showing a step of connecting the bendable battens to a deployment device;

FIG. 26 is a partial schematic perspective view of the aircraft structure and the thermoacoustic insulation module after the step of actuating the deployment device, shown in FIG. 25;

FIG. 27 is a similar view to FIG. 26, showing the thermoacoustic insulation module alone;

FIG. 28 is a side schematic view of the thermoacoustic insulation module, showing a step of attaching opposing longitudinal ends of the load-bearing structure to the aircraft structure;

In all of these figures, identical reference numbers can denote identical or similar elements.

DETAILED DESCRIPTION OF THE PREFERRED EMBODIMENTS

As explained above, the idea underlying the invention comprises replacing a plurality of padded panels used to constitute a known type of thermoacoustic insulation system with a single mat, the latter therefore having dimensions considerably larger than the dimensions of the padded panels used in the prior art.

FIGS. 1 to 15 show a method for manufacturing a thermoacoustic insulation module for an aircraft according to a preferred embodiment of the invention, comprising such a mat. The method described as an illustrative example concerns the insulation of an airplane cabin, i.e., the substantially semi-cylindrical space situated above a floor of the airplane, but can be applied similarly to the insulation of other parts of an airplane or any type of aircraft.

FIGS. 16 to 23 show an example of a bendable structure and of a bending method, used in the method for manufacturing a thermoacoustic insulation module according to the preferred embodiment of the invention.

FIGS. 24 to 36 show a thermoacoustic insulation method for insulating a portion of an aircraft by means of the thermoacoustic insulation module, and make it possible to appreciate the advantages obtained by such a module.

In the present description as a whole, the longitudinal direction X of the mat is defined as being the direction parallel to the longitudinal direction of the aircraft equipped with such a mat, i.e., the direction of the roll axis of the aircraft. The transverse direction Y is defined as being the direction orthogonal to the longitudinal direction X and to the vertical direction Z of the aircraft. When the mat is arranged flat, the transverse direction Y of the mat corresponds to the direction contained in the plane of the mat and orthogonal to the longitudinal direction X, while the vertical direction Z corresponds to the thickness direction of the mat.

Figure 1:
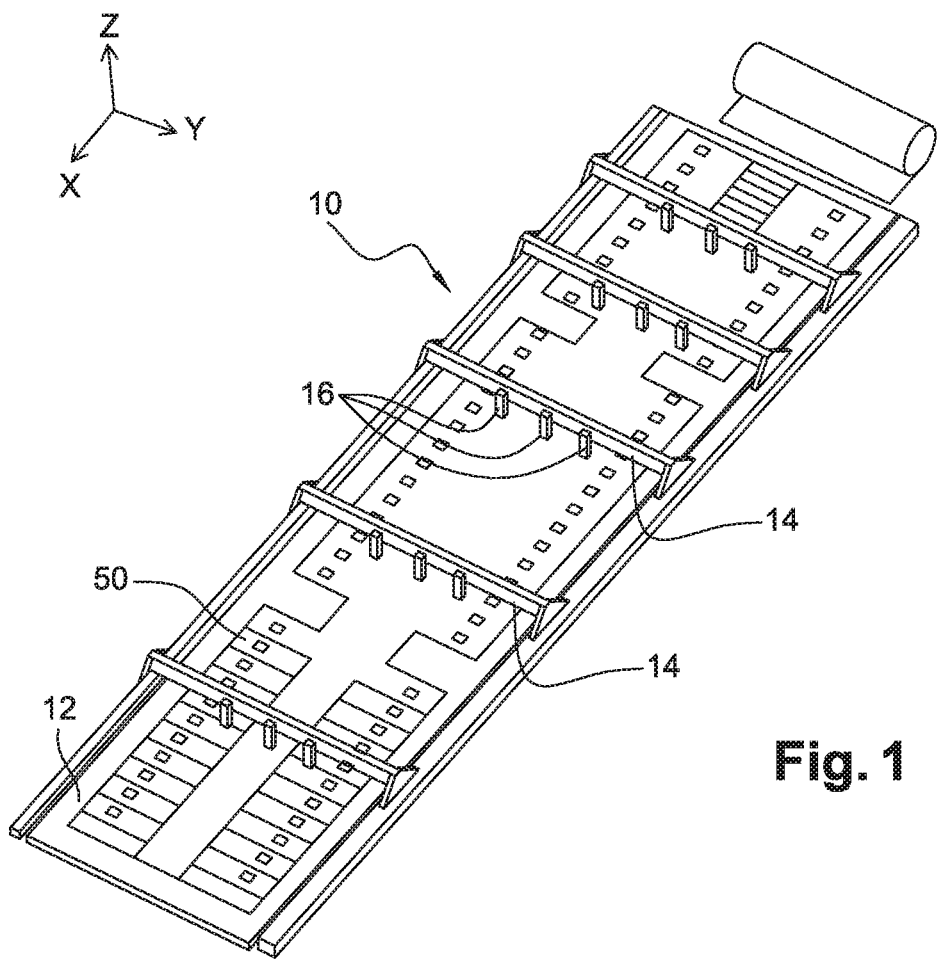
FIG. 1 is a schematic perspective view of a machine for automatically implementing steps of manufacturing a mat, in the context of a method according to a preferred embodiment of the invention.

FIG. 1 shows, schematically, a machine 10 suitable for automatically implementing steps of the manufacturing method.

To this end, the machine 10 comprises a support plate 12 of large dimensions, for example larger than the dimensions of a semi-cylindrical portion of an airplane fuselage rolled out flat, enabling such a mat to be supported.

The machine 10 further comprises gantries 14 equipped with numerically controlled tools 16 dedicated, for example, to operations for deploying reels of film and reels of insulating material, cutting operations, welding operations, stitching operations, marking operations, and mat handling operations.

It is clear to a person skilled in the art that the configuration of the machine 10 can easily be adapted to the configuration of the thermoacoustic insulation module that is to be manufactured, which depends on the configuration of the aircraft that is to be equipped.

The mat is produced from a raw mat, which is itself manufactured by the superposition of layers of insulating material and wrapping film.

Figure 2:
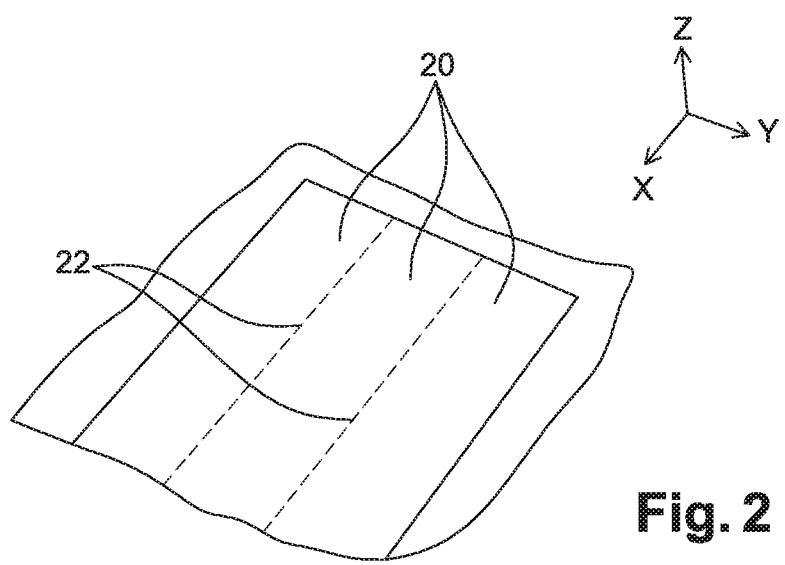
FIGS. 2 and 3 are partial schematic perspective views of a raw mat during a step of producing said raw mat.

These layers can be formed by assembling, for example by heat welding, layers of material 20 with a width smaller than that of the mat that is to be manufactured, connected along longitudinal lines 22 (FIG. 2).

As a variant, at least some of the layers of material forming the raw mat can be formed directly from reels having the full width of the mat that is to be manufactured, as explained below.

Figure 3:
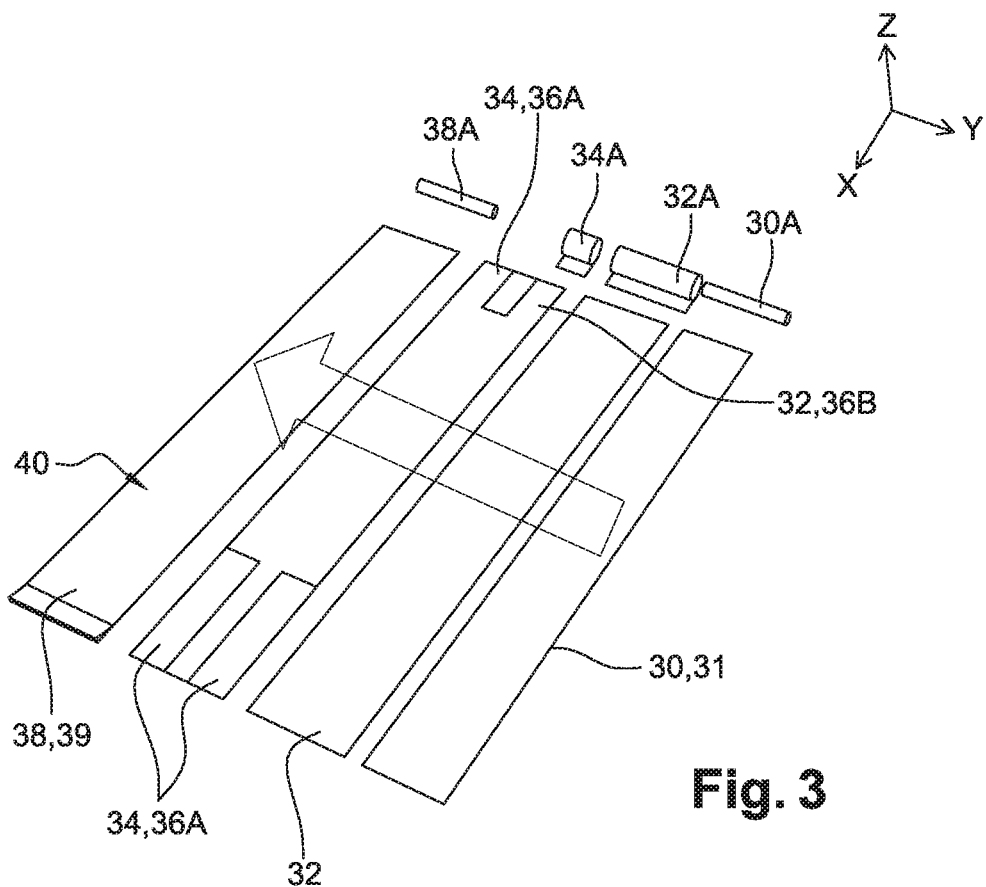
Figure 4:
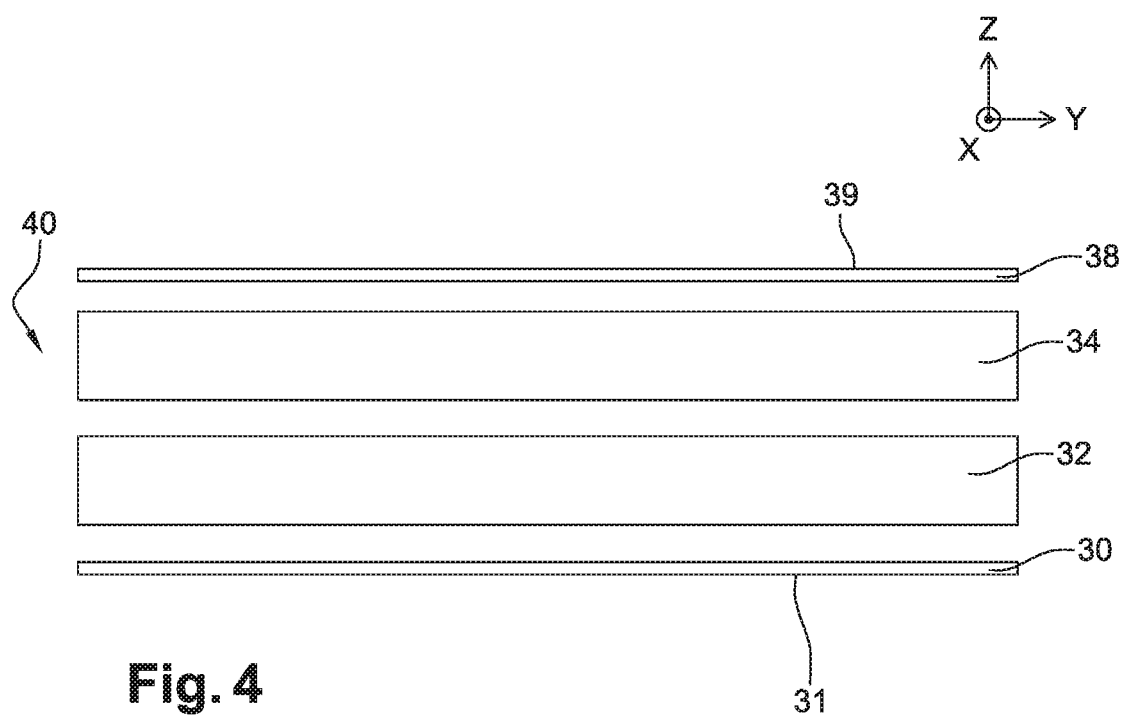
FIG. 4 is an exploded cross-sectional view of the raw mat of FIGS. 2 and 3.
Figure 5:
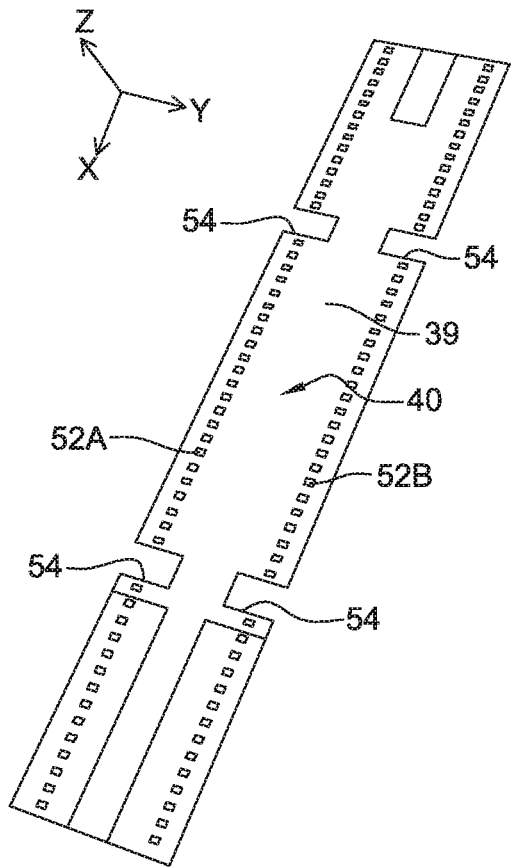
FIGS. 5 to 7 are partial schematic perspective views of a mat during a step of producing said mat from the raw mat of FIGS. 2 to 4.
Figure 6:
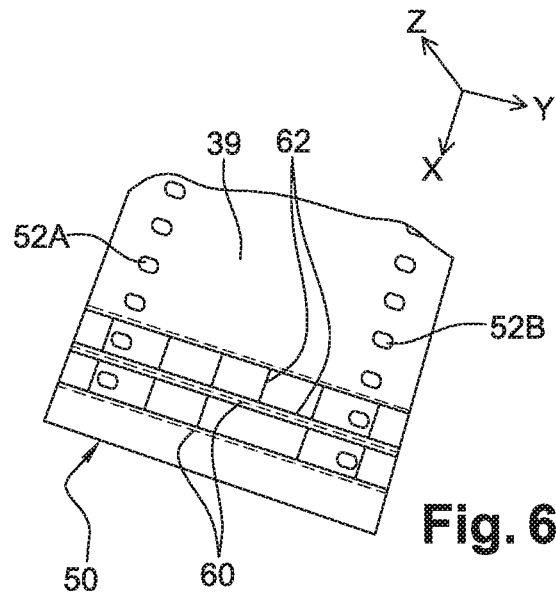

FIG. 3 shows a step of producing the raw mat, and shows, from right to left:

an outer film 30 intended to form an outer surface 31 of the raw mat, the result of a step of depositing a first layer of thermoacoustic insulation 32 on the outer film 30, the result of a subsequent step of depositing a second layer of thermoacoustic insulation 34 on first areas 36A of the first layer of thermoacoustic insulation 32, leaving one or more second areas 36B of the first layer of thermoacoustic insulation 32 not covered by the second layer of thermoacoustic insulation 34, and the raw mat 40, an exploded cross-sectional view of which can also be seen in FIG. 4, obtained after a subsequent step of depositing an inner film 38 on the second layer of thermoacoustic insulation 34 and on the second areas 36B of the first layer of thermoacoustic insulation 32. The inner film 38 is intended to form an inner surface 39 of the raw mat.

Each of the layers 30, 32, 38 is obtained from a corresponding full-width reel 30A, 32A, 38A (FIG. 3), whereas the second layer of thermoacoustic insulation 34 is deposited in the form of narrower strips, formed from a reel 34A of corresponding width.

Depositing the second layer of thermoacoustic insulation 34 on the first areas 36A of the first layer of thermoacoustic insulation 32 helps give said areas enhanced insulation properties compared to the second areas 36B. The method therefore makes it possible to satisfy the need for areas of locally enhanced insulation, which is common in aircraft, and which is satisfied in the prior art by using padded panels that have different levels of insulation.

The method then comprises a step of producing the mat 50 of the thermoacoustic insulation module from the raw mat 40, by implementing finishing operations that are applied to the raw mat.

These finishing operations comprise, for example, the creation of two rows of porthole openings 52A, 52B (FIG. 5) arranged on two opposing lateral sides of the mat, and several aircraft cabin door openings 54, in the raw mat.

The finishing operations generally comprise operations for cutting out the outer contours and inner contours of the mat, and operations for welding the outer film 30 to the inner film 38 to seal the mat closed at the outer and inner contours. These operations also preferably comprise operations for producing padding studs housed between the inner and outer films to prevent deformations of the layers of insulation 32, 34.

The finishing operations can further comprise the creation of markings on the inner surface 39 (FIG. 6), which advantageously include transverse markings 60 that coincide with the intended location of contact between the mat and the circumferential frames of the airplane fuselage, as will become more clearly apparent below. Other markings 62 can be used to locate precutting areas, with a view to facilitating possible subsequent repairs of the mat, or to mark locations intended to be perforated in order to allow supports of various systems of the airplane to pass through same. With respect to possible subsequent repairs of the mat, a damaged area can indeed be removed by following the precutting markings, ensuring that the dimensions of the removed part are known in advance. This means that having a range of repair kits with the dimensions of the areas delimited by the precutting markings is sufficient in order to ensure the maintenance of the mat as a whole.

Once the mat 50 has been produced, the method generally proceeds with a step of attaching a bendable structure to the mat.

Figure 7:
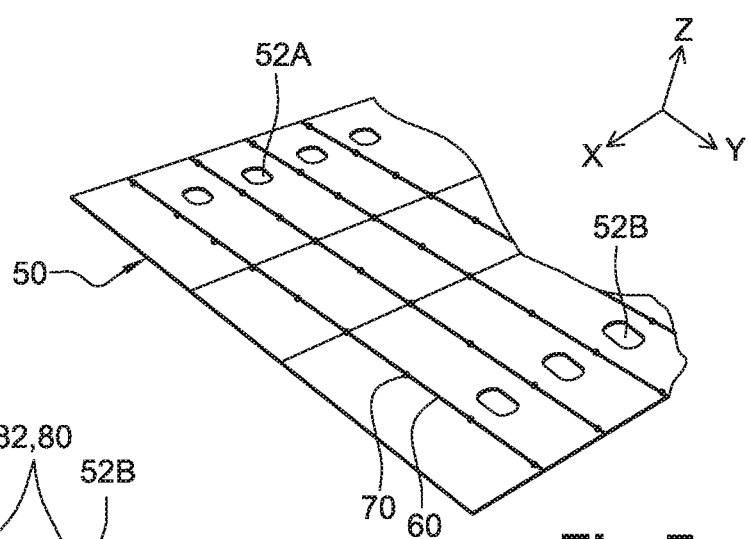
Figure 8:
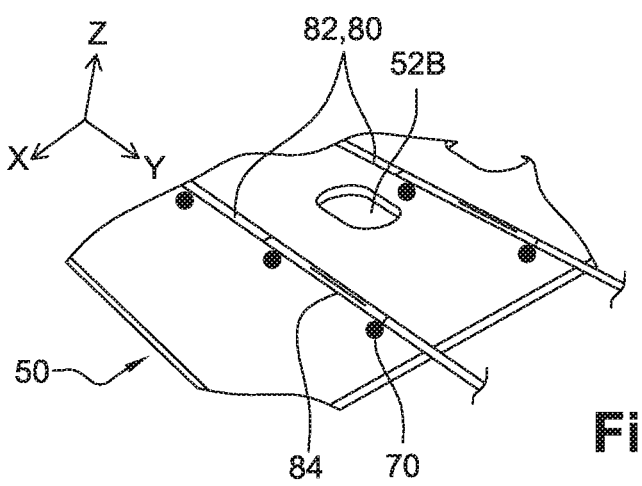
FIG. 8 is a partial schematic perspective view of the mat, showing a step of attaching bendable battens forming a bendable structure on the mat.

This step comprises first attaching reversible attachment devices 70 to the mat (FIG. 7). These devices 70 each form, for example, the loop part or the hook part of a hook and loop device. These devices 70 are advantageously positioned along the abovementioned markings 60.

Next, bendable battens 80, together forming the abovementioned bendable structure 82, are attached to the mat (FIG. 8) by means of the reversible attachment devices 70. Naturally, to this end, the battens comprise the other parts (with hooks or loops) which make it possible to form, in cooperation with the devices 70, hook and loop devices.

The bendable battens 80 are therefore detachably attached to the mat, and are thus arranged along the abovementioned markings 60, parallel to the transverse direction Y of the mat, and spaced apart from each other in the longitudinal direction X. The bendable battens incorporate feet 84 (partially visible in FIG. 8) at their ends. As a variant, the latter can be mounted on the bendable battens 80 at a later stage. The feet 84 are provided with respective wheels and lifting cylinders (not shown in FIG. 8).

The method then comprises a step of compacting the mat 50. This step comprises firstly raising the segments 90 of the mat each situated between two corresponding consecutive bendable battens 80, in such a way as to give the mat an undulated shape in the longitudinal direction X (FIG. 9), and secondly of bringing the segments 90 closer together, and moving the bendable battens 80 closer together, by compressing the segments 90, in such a way as to reduce the space requirement of the mat in the longitudinal direction X (FIG. 10). Using this method, the space requirement of the mat can typically be reduced by a factor of 10.

As with the preceding operations, the compacting operations are advantageously well suited to automated implementation.

The method then comprises a step of connecting the bendable battens 80 to at least one synchronization device 110 (FIG. 11), connecting the bendable battens 80 to each other in such a way as to synchronize the movements of the bendable battens relative to each other in the longitudinal direction X, as will become more clearly apparent below.

In the example shown, there are two synchronization devices 110, each comprising a plurality of deformable parallelograms 112 articulated with each other in series and respectively connected to the bendable battens 80.

Each synchronization device 110 therefore comprises two sets 114A, 114B of rods mounted end to end, being articulated with each other by their respective ends, the rods of the first set 114A being further articulated with the rods of the second set 114B by their respective middles, in such a way as to form said plurality of deformable parallelograms 112, as will become more clearly apparent below.

As shown in FIG. 11, the synchronization devices 110 are advantageously arranged respectively in two longitudinal recesses 116A, 116B formed in the top surface 118 of the compacted mat, respectively by the two rows of porthole openings 52A, 52B.

The step of connecting the bendable battens 80 to the synchronization devices 110 can, as a variant, be implemented before the step of compacting the mat 50.

Figure 12:
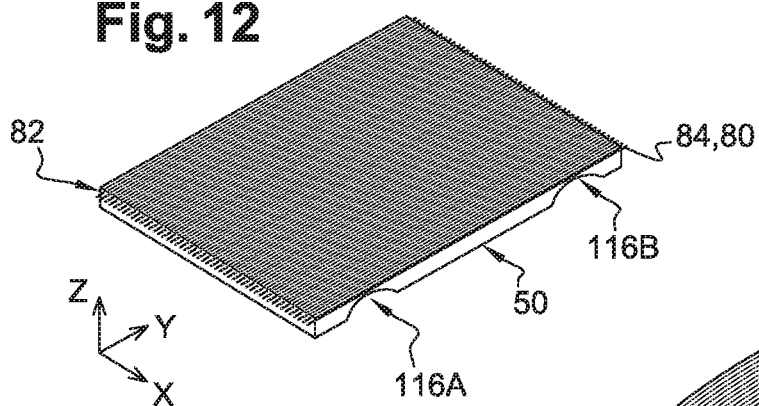
FIGS. 12 to 14 are schematic perspective views of the mat and the bendable structure, showing a step of bending the bendable structure to form a load-bearing structure, said load-bearing structure forming, with the mat, a thermoacoustic insulation module.

As shown in FIG. 12, the method next preferably comprises a step of turning over the mat 50 provided with the bendable battens 80 and the synchronization devices 110 (the latter not being visible in FIG. 12).

Figure 13:
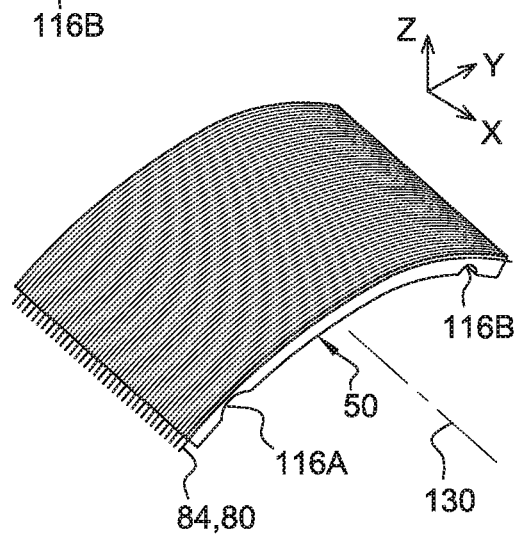
Figure 14:
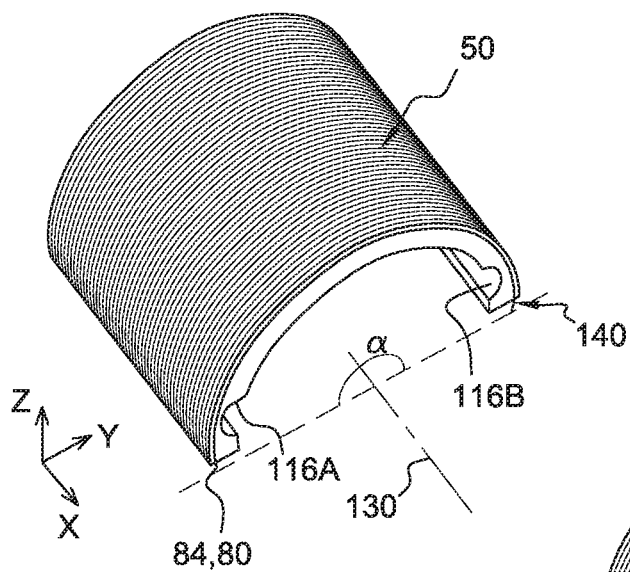
Figure 15:
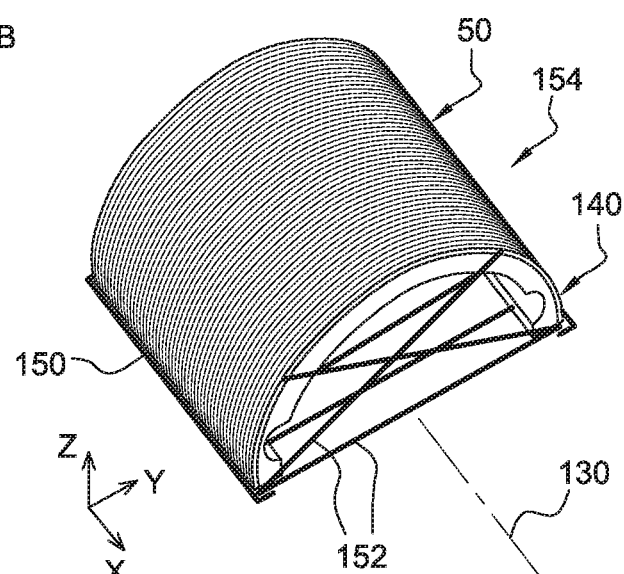
FIG. 15 is a partial schematic perspective view of the mat and of the bendable structure equipped with a longitudinal retaining device and a transverse retaining device.

The method next comprises a step of bending the bendable structure 82, along a bending axis 130 parallel to the longitudinal direction X of the mat 50 (FIGS. 13 and 14). In this case, this step comprises bending the bendable battens 80, which then constitute bent battens.

In its bent configuration, the bendable structure thus forms a load-bearing structure 140 supporting the mat 50 in a curved shape, with an axis of curvature corresponding to the bending axis 130.

In order to ensure the stability of the assembly, the manufacturing method advantageously comprises a step of installing a longitudinal retaining device 150 configured to prevent the bent battens 80 from moving apart from each other in the longitudinal direction X (FIG. 15), and a step of installing a transverse retaining device 152 configured to hold the load-bearing structure 140 in its bent shape. These devices, which are formed from bars and fastening members for fastening to the load-bearing structure 140, are shown very roughly and will not be described in detail, since a person skilled in the art is capable of designing such devices by means of conventional methods from the indications provided above.

As a variant, the bendable battens 80 can be attached non-detachably to the mat, by non-reversible means, without departing from the scope of the invention.

As a further variant, the manufacturing method may not comprise a step of compacting the mat, in which case the step of connecting the battens to the synchronization devices is also omitted.

The assembly constituted by the load-bearing structure 140 and the mat 50, and the longitudinal retaining device 150 and transverse retaining device 152, thus forms the thermoacoustic insulation module 154 obtained at the end of the manufacturing method described above.

In view of the explanations above, it is clear that the load-bearing structure 140 is attached to the mat 50 in a detachable manner.

Moreover, it should be understood that the load-bearing structure 140 is deployable from a retracted configuration in which it is retracted along the longitudinal direction X of the mat, corresponding to a compacted configuration of the mat 50, to a deployed configuration in which it is deployed along the longitudinal direction X, corresponding to an installation configuration of the mat.

Such a deployment is implemented by deforming the deformable parallelograms 112 that constitute the synchronization devices 110.

The retracted configuration of the load-bearing structure 140 is therefore a configuration in which the bent battens 80 are relatively close together, and in which the deformable parallelograms 112 have an elongate shape in the vertical direction, whereas the deployed configuration of the load-bearing structure 140 is a configuration in which the bent battens 80 are relatively far apart from each other, and in which the deformable parallelograms 112 have an elongate shape in the longitudinal direction.

As a variant, this load-bearing structure 140 can be designed so as to be non-detachable, without departing from the scope of the present invention.

As a further variant, the load-bearing structure 140 may not be of a deployable native, without departing from the scope of the present invention.

Generally, supporting the mat 50 in its curved shape allows the mat to be installed easily in an aircraft portion that is to be insulated, as will become more clearly apparent below. This makes it possible to use a mat of large dimensions to insulate the whole, or at least a major part, of a portion of an aircraft, such as a cabin.

The mat is therefore typically between 4 meters and 15 meters wide, and between a few meters (in the case of a mat intended to insulate a small section of cabin) and several tens of meters long, typically between 20 meters and 100 meters long (in the case of a mat intended to insulate the whole or nearly all of a cabin).

Moreover, the angle of curvature a of the mat (FIG. 14) is typically greater than 120 degrees, and is preferably equal to approximately 180 degrees.

Moreover, as a result of its reduced space requirement in the retracted configuration, the thermoacoustic insulation module 154 according to the preferred embodiment of the invention described above can easily be stored until it is used to insulate an aircraft portion.

A bendable structure and a bending method, used in the method for manufacturing the thermoacoustic insulation module according to the preferred embodiment of the invention, will now be described in reference to FIGS. 16-23.

FIGS. 16 to 19 show a bendable element 160 that comprises an inflatable envelope 161, capable of being inflated typically under a pressure of a few bars, and a first elongate, bendable base plate 162, attached to a first face of the inflatable envelope, a second base plate 163, that is also bendable and elongate, attached to a second face of the inflatable envelope opposite the first face, and links 164 connecting the first base plate 162 to the second base plate 163. Moreover, the second base plate 163 is shorter than the first base plate 162.

Naturally, the inflatable envelope 161 comprises a connector 165 for connecting it to a pressurized gas source 166 in order to inflate the envelope 161.

Figure 16:
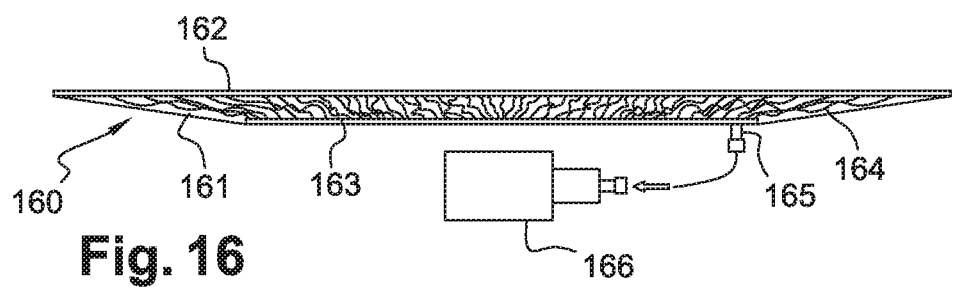
FIG. 16 is a schematic view in longitudinal cross section of a bendable element, in the non-bent state.
Figure 17:
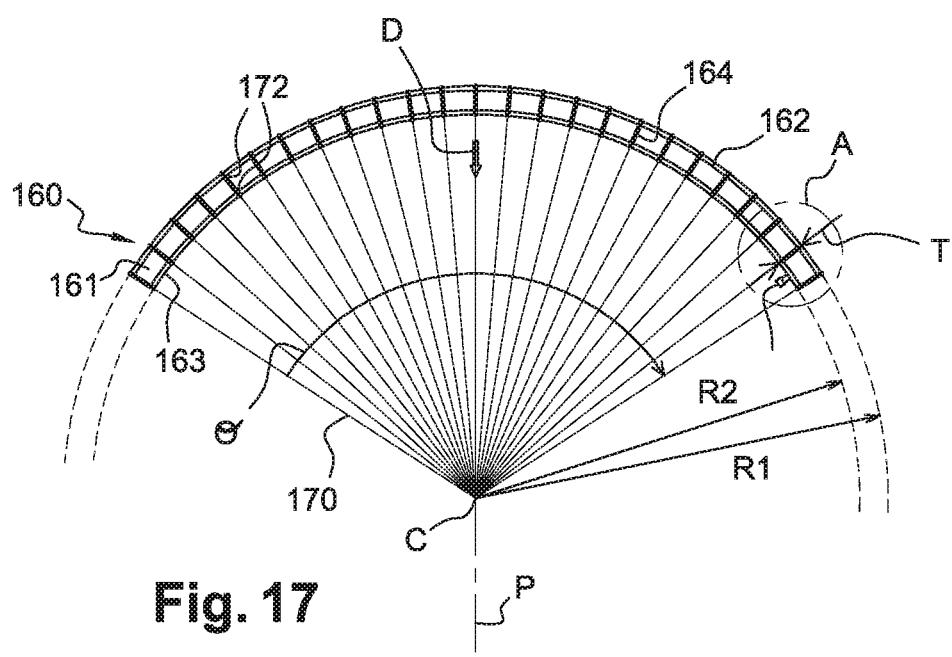
FIG. 17 is a schematic view in longitudinal cross section of the bendable element of FIG. 16, in the bent state.
Figure 18:
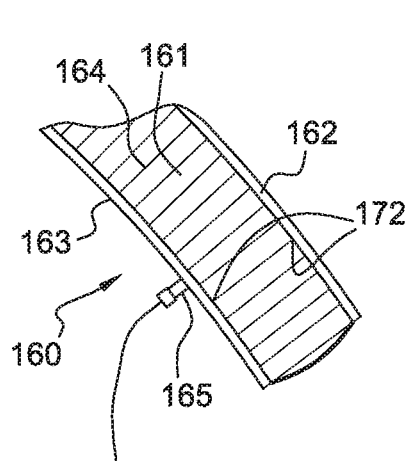
FIG. 18 is a larger-scale view of a part A of FIG. 17.
Figure 19:
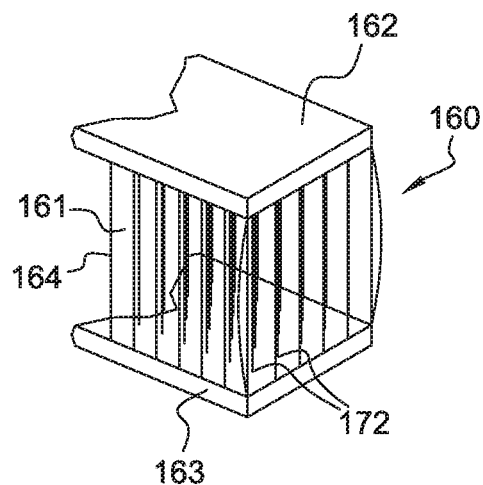
FIG. 19 is a partial schematic perspective view of the bendable element of FIG. 16.

When the relative pressure inside the inflatable envelope 161 is zero, the geometry of the bendable element 160 is substantially planar (FIG. 16). However, when the relative pressure inside the inflatable envelope 161 is sufficiently high, the bendable element 160 adopts a bent geometry, i.e., an arcuate geometry (FIGS. 17-19). More specifically, the action of inflating the inflatable envelope 161 causes the first and second base plates 162, 163 to bend in a direction of curvature D extending from the first base plate 162 to the second base plate 163.

The arcuate shape induced by the action of inflating the inflatable envelope 161 results from the fact that the second base plate 163 is shorter than the first base plate 162, and from the arrangement of the links 164 connecting the first base plate 162 to the second base plate 163.

Indeed, these links 164 are arranged in such a way as to be slack when the inflatable envelope 161 is in a deflated state, and such that the action of inflating the inflatable envelope results in the tensioning of the links 164, culminating with the links extending along radii of curvature 170 common to the first and second base plates 162, 163. The links 164 then hold the second base plate 163 centered longitudinally relative to the first base plate 162. It should therefore be understood that the links 164, when tensioned, extend in respective directions that converge towards a common center C, thus corresponding to the center of curvature of the first and second base plates 162, 163.

As shown in FIG. 17, the first and second base plates 162, 163 are then centered longitudinally relative to a same transverse plane P, and form a bending angle θ of the bendable element 160. The first base plate 162, which extends on a radially outer side of the bendable element 160, thus defines a radius of curvature R1, while the second base plate 163, which extends on a radially inner side of the bendable element, defines a radius of curvature R2. Moreover, the spacing T between the first and second base plates 162, 163, which is equal to the difference between the radii of curvature R1 et R2, defines the thickness of the bendable element.

In order to be able to be bent, the first and second base plates 162, 163 are flexible but nevertheless have a certain degree of rigidity. To this end, the first and second base plates are advantageously produced from a composite material of the CFRP (a composite with a carbon-fiber-reinforced plastic matrix) or GFRP (a composite with a glass-fiber-reinforced plastic matrix) type. The first and second base plates can thus be similar to the bending battens of certain boat sails.

The links 164 are preferably inextensible flexible threads, such as threads produced from high-tenacity aramid fibers, for example from poly-paraphenylene terephthalamide or PPD-T (a material known under the registered trademark "Kevlar").

Moreover, the junction points 172 of the links 164 with the first and second base plates 162, 163 are preferably distributed in a uniform manner at the surface of each of these first and second base plates (FIGS. 17-19).

In the example shown in the figures, the base plates are housed in the inflatable envelope. This helps ensure the tight sealing of the inflatable envelope in a simple manner As a variant, the base plates can be attached to an outer surface of the inflatable envelope. In this case, the links connect together parts of the inflatable envelope to which the first and second base plates respectively are attached. The links therefore indirectly connect the base plates to each other.

The bendable element 160 described above can be bent by means of a bending method comprising the steps:

providing the bendable element 160, of which the inflatable envelope 161 is in the deflated state and the first and second base plates 162, 163 are not bent, connecting the inflatable envelope 161 to a pressurized gas source 166 (FIG. 16), inflating the inflatable envelope 161 by means of the pressurized gas source 166, until the links 164 of the bendable element are tensioned in such a way that the first and second base plates 162, 163 assume a bent shape.

The bendable element 160 described above can be used as it is as a bendable batten in the context of the method for manufacturing the thermoacoustic insulation module described above.

However, for purely geometric reasons, the bending angle of the bendable element 160 described above is limited to approximately 114 degrees.

Figure 20:
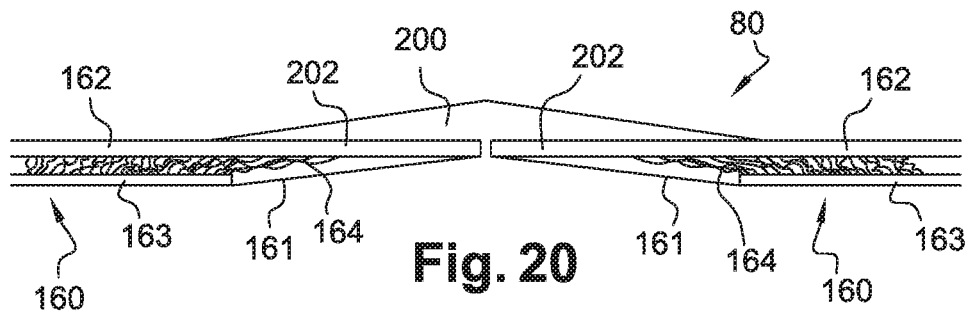
FIG. 20 is a partial schematic view in longitudinal cross section of a bendable batten, in the non-bent state.
Figure 21:
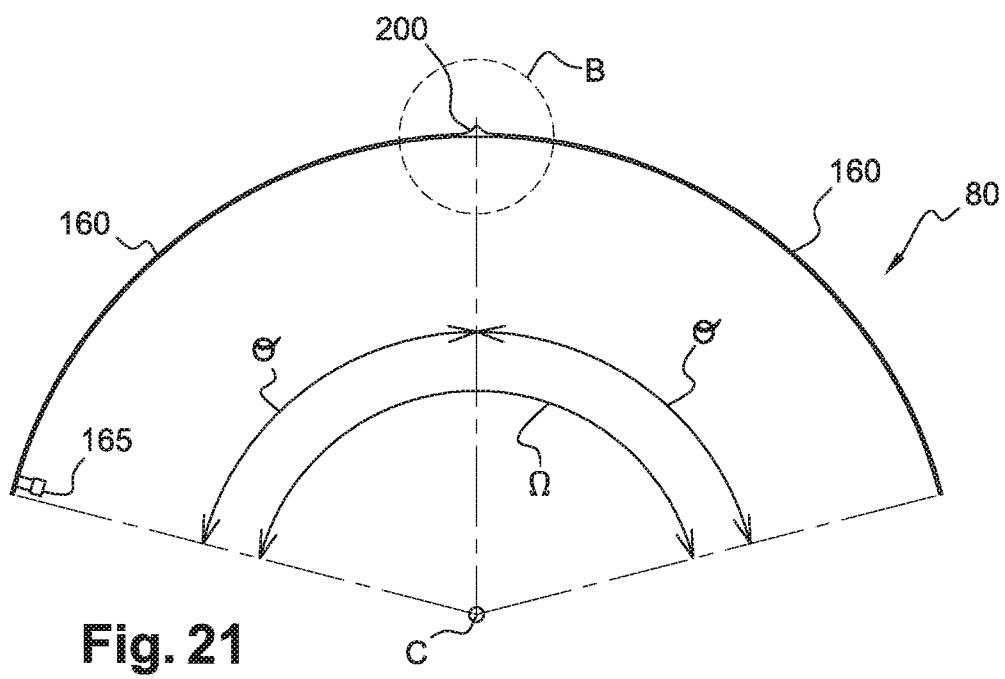
FIG. 21 is a schematic view in longitudinal cross section of the bendable batten of FIG. 20, in the bent state.
Figure 22:
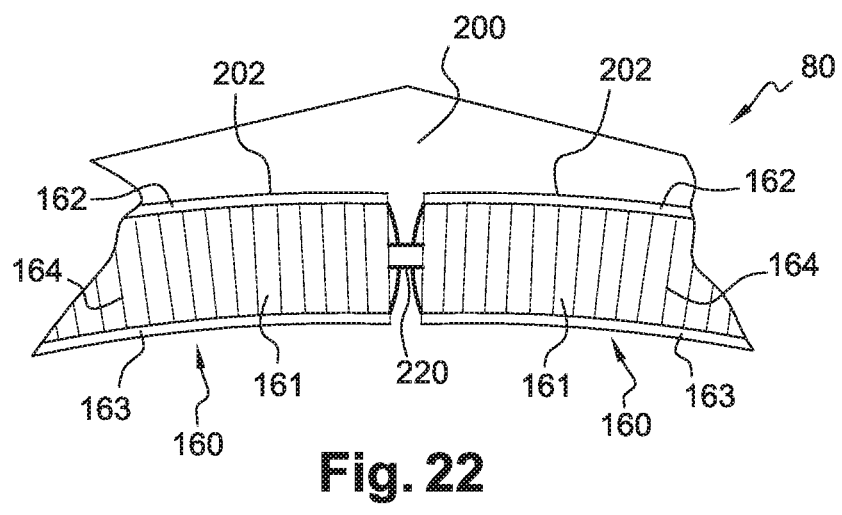
FIG. 22 is a larger-scale view of a part B of FIG. 21.

Yet, it is preferable to have a bendable batten that has a bending angle greater than the abovementioned limit To this end, as shown in FIGS. 20-22, a bendable batten 80, used in the method for manufacturing the thermoacoustic insulation module described above, is formed at least from one junction element 200, and from two bendable elements 160 of the kind described above, similar to each other, the first respective base plates 162 of which have adjacent respective ends 202 attached to the junction element 200.

As shown in FIG. 21, the bendable elements 160 of this bendable batten 80 are advantageously shaped such that the first and second base plates 162, 163 of each of the bendable elements form a bending angle θ of between 57 degrees and 115 degrees.

Thus, the bendable batten has a bending angle Ω higher than 114 degrees, and capable of reaching 230 degrees.

The function of the junction element 200 is to make the junction between the two bendable elements 160 more rigid. To this end, the connection between each of the first respective base plates 162 of the two bendable elements 160 and the junction element 200 is an interlocking connection.

The junction element 200 preferably has a small extent in the longitudinal direction of the bendable elements 160, such that the junction area between each of the first base plates 162 and this junction element 200 is substantially planar, including when the bendable batten 80 is in the bent state. The junction element 200 can therefore indiscriminately have a planar or curved attachment surface for receiving the first base plates 162.

The respective inflatable envelopes 161 of the two bendable elements 160 can be provided with respective connectors in order to each be connected to a pressurized gas supply source.

As a variant, in the example shown in FIGS. 20-22, the respective inflatable envelopes 161 of the two bendable elements 160 are brought into fluid communication with each other by a connection element 220 (FIG. 22). In this case, only one of the respective inflatable envelopes 161 of the two bendable elements 160 is provided with a connector 165, allowing both of the inflatable envelopes 161 to be connected to a pressurized gas supply source.

The bendable batten 80 described above can be bent by means of a bending method comprising the steps:

providing the bendable batten 80, in which the inflatable envelope 161 of each bendable element 160 is in the deflated state and the first and second base plates 162, 163 of each bendable element 160 are not bent, connecting the respective inflatable envelopes 161 of the bendable elements 160 of the bendable batten 80 to at least one pressurized gas source 166, simultaneously inflating the respective inflatable envelopes 161 of the bendable elements 160 of the bendable batten 80 by means of the pressurized gas source 166, until the links 164 of each bendable element 160 are tensioned in such a way that the first and second base plates 162, 163 of each bendable element assume a bent shape.

In the preferred embodiment of the invention, the inflatable envelopes 161 are connected to a same pressurized gas source 166 by means of the connector 165 of one of the inflatable envelopes 161.

Naturally, bendable elements 160 of the kind described above can be used similarly for forming a bendable batten comprising three bendable elements 160 arranged end to end or more, in order to give the batten a bending angle of more than 230 degrees.

Figure 23:
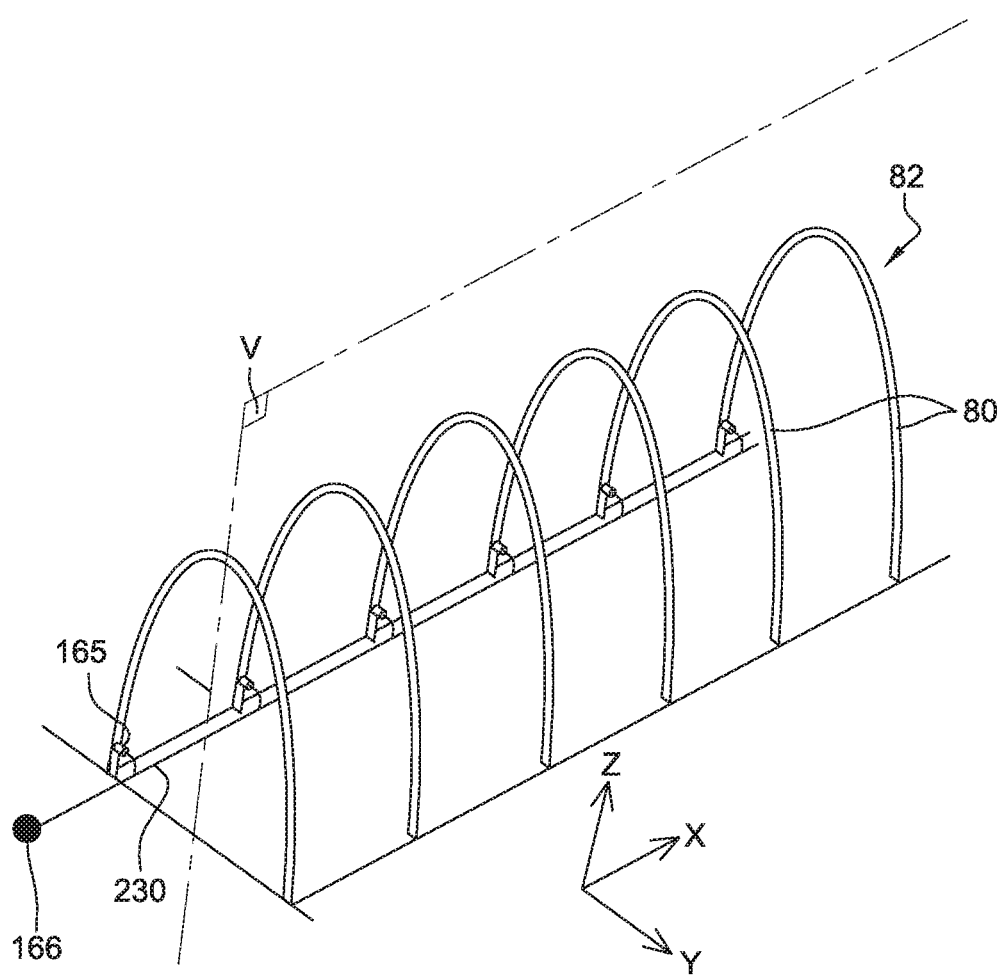
FIG. 23 is a schematic perspective view of the bendable structure, formed from bendable battens similar to the bendable batten of FIG. 20, during the step of bending this structure shown in FIGS. 12 to 14.

The bendable battens 80 of the kind described above are used to form the bendable structure 82, shown in FIG. 23 in its bent shape corresponding to the load-bearing structure 140. In this structure, the bendable battens 80 are centered relative to a same plane V transverse to the first and second base plates 162, 163 of the bendable elements 160 forming the bendable battens 80.

Preferably, the connectors of each bendable element, or the respective connectors 165 of a bendable element 160 of each bendable batten 80, are connected to a same pressurized gas source 166 by a pressurized gas distribution circuit 230.

In view of the preceding description of the bendable structure 82, it is clear that the step of bending this structure can comprise a method comprising the steps:

providing the bendable structure 82, in which the inflatable envelope 161 of each bendable element 160 is in the deflated state and the first and second base plates 162, 163 of each bendable element 160 are not bent, connecting the respective inflatable envelopes 161 of the bendable elements 160 of the bendable structure 82 to at least one pressurized gas source 166, simultaneously inflating the respective inflatable envelopes 161 of the respective bendable elements 160 of the bendable structure 82 by means of the pressurized gas source 166, until the links 164 of each bendable element 160 are tensioned in such a way that the first and second base plates of each bendable element assume a bent shape.

A thermoacoustic insulation method for insulating a portion of an aircraft by means of the thermoacoustic insulation module 154 will now be described in reference to FIGS. 24 to 36.

Figure 24:
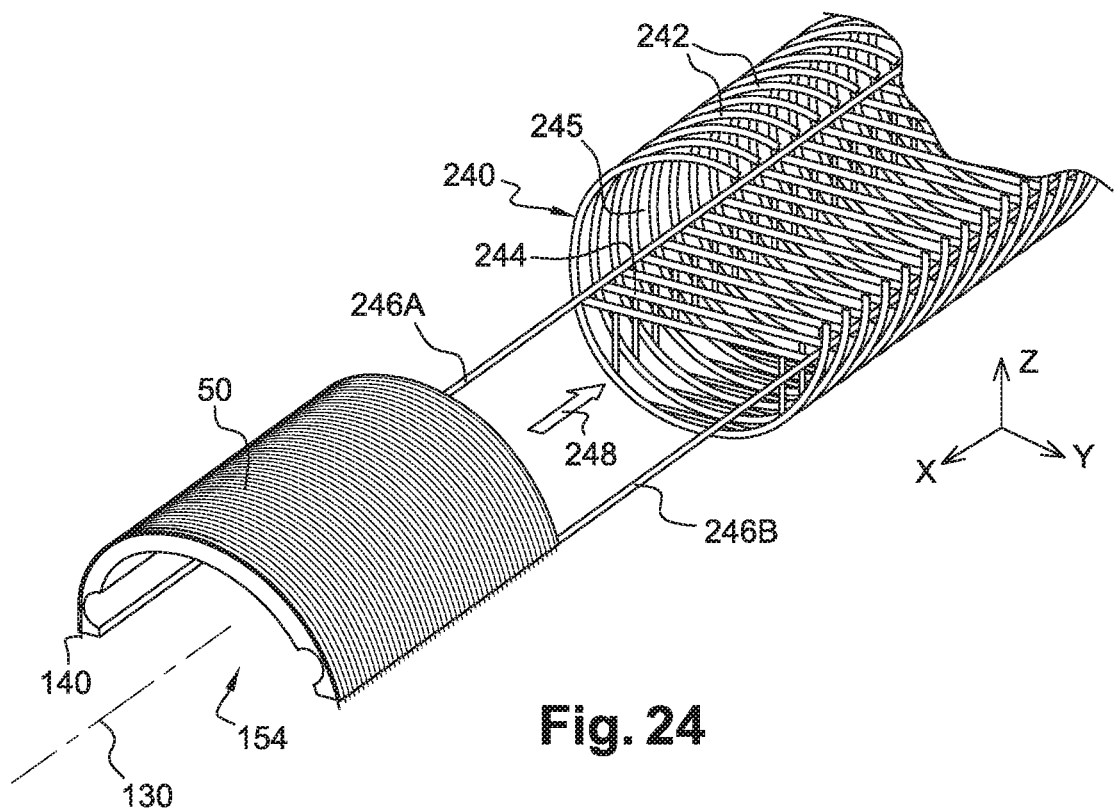
FIG. 24 is a partial schematic perspective view of an aircraft structure and the thermoacoustic insulation module of FIG. 14, during a step of inserting this module into a space delimited by the aircraft structure.

FIG. 24 shows an aircraft structure 240, more particularly circumferential frames of an airplane fuselage 242, and floor beams 244. The frames 242 and the beams 244 delimit, above the beams, an aircraft portion 245 that is intended to constitute a cabin of the aircraft and, below the beams, a portion intended to constitute a hold of the aircraft, in a manner that is well known. In the example described here, the insulation method concerns the portion intended to constitute the cabin.

In order to facilitate the insertion of the thermoacoustic insulation module 154 into the aircraft portion 245 that is to be insulated, two rails 246A, 246B are arranged in the longitudinal direction X of the aircraft, on the ends of the floor beams 244.

Figure 25:
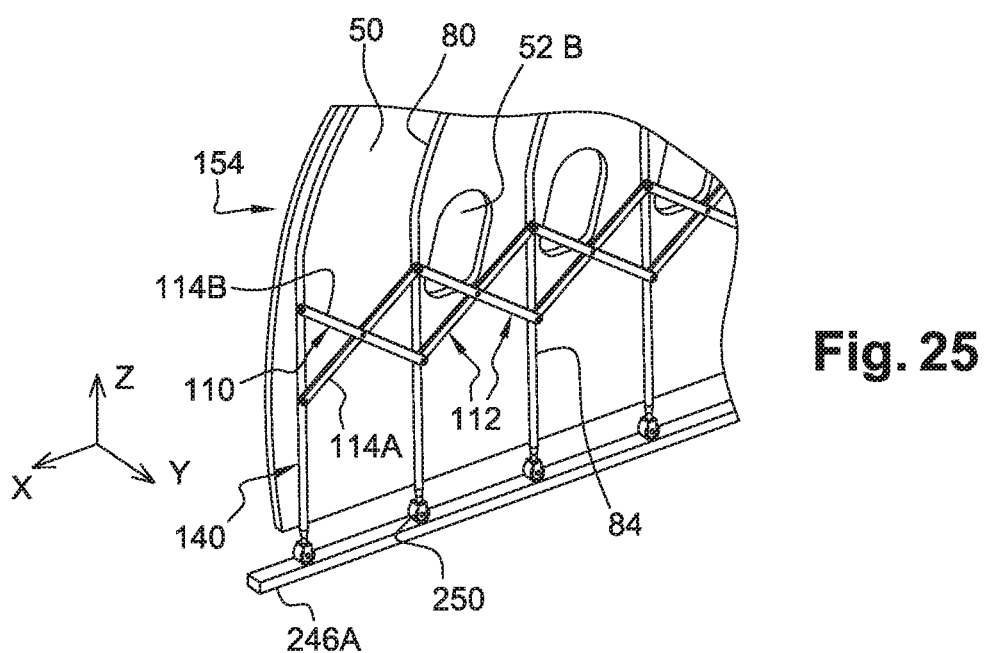
FIG. 25 is a partial schematic perspective view of the thermoacoustic insulation module alone, showing a step of actuating a deployment device that brings the load-bearing structure into a deployed configuration and the mat into an installation configuration.

The thermoacoustic insulation module 154 is mounted on the rails 246A, 246B by engaging the wheels 250 of the feet 84 of the bendable battens 80 in the rails, as shown more clearly in FIG. 25, which shows a subsequent step of the method.

Next, the thermoacoustic insulation module 154 is moved along the rails until it enters the aircraft portion 245, as symbolized by the arrow 248 in FIG. 24.

Given that the load-bearing structure 140 of the thermoacoustic insulation module 154 is in its retracted configuration, the insulation method then comprises a step of deploying the load-bearing structure 140 in such a way as to bring the mat 50 into its installation configuration.

The deployment step comprises moving the longitudinal ends of the load-bearing structure 140 apart from each other, in such a way as to move the bent battens 80 apart from each other by deforming the deformable parallelograms 112 that constitute the synchronization devices 110, as explained above and as shown in FIG. 25.

At the end of this deployment step, the bent battens 80 are preferably positioned respectively facing the circumferential fuselage frames 242.

FIG. 26 shows the aircraft structure 240 containing the thermoacoustic insulation module 154, the load-bearing structure of which is in the deployed configuration. The thermoacoustic insulation module 154 in this configuration is also shown on its own in FIG. 27 for greater clarity.

The method then comprises a step of attaching opposing longitudinal ends 280, 282 of the load-bearing structure 140 to the aircraft structure 240 delimiting the aircraft portion that is to be insulated, in such a way as to apply tensile stress F to the load-bearing structure 140 in the longitudinal direction X (FIG. 28).

Figure 29:
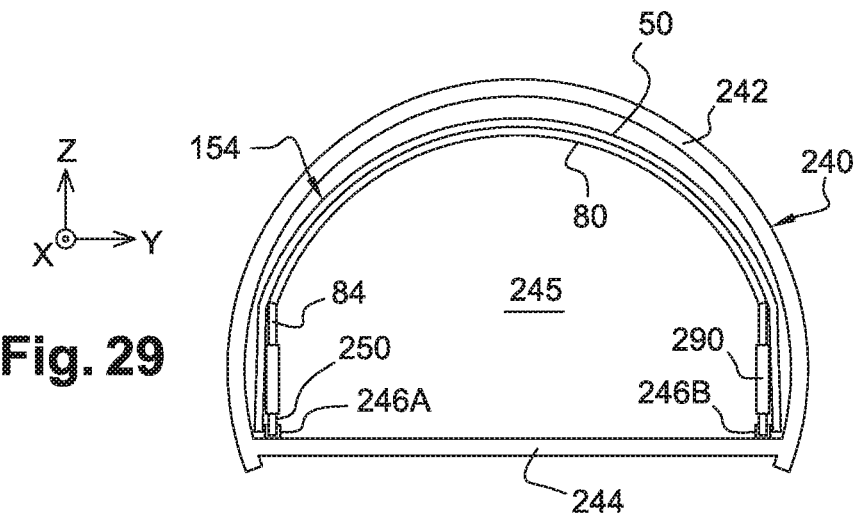
FIG. 29 is a schematic view, in cross section according to the plane S of FIG. 26, of the aircraft structure and the thermoacoustic insulation module.
Figure 30:
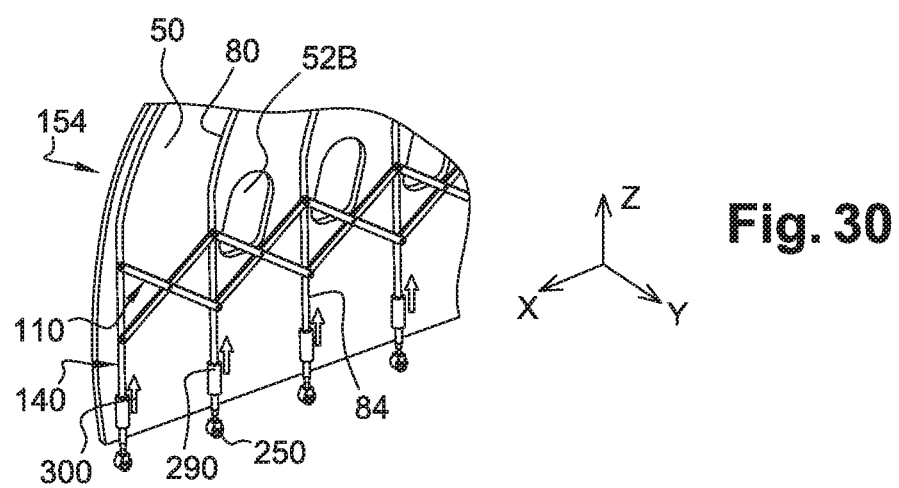
FIG. 30 is a similar view to FIG. 25, showing a step of raising the load-bearing structure of the thermoacoustic insulation module.

FIG. 29 is a cross sectional view according to the plane S of FIG. 26, and thus shows a circumferential fuselage frame 242, a floor beam 244, and a bent batten 80 resting on its two feet 84, on which batten the mat 50 rests in its curved shape. FIG. 29 in particular shows the wheels 250 engaged in the abovementioned rails 246A, 246B, and the two lifting cylinders 290 respectively integrated with the feet 84.

Figure 31:
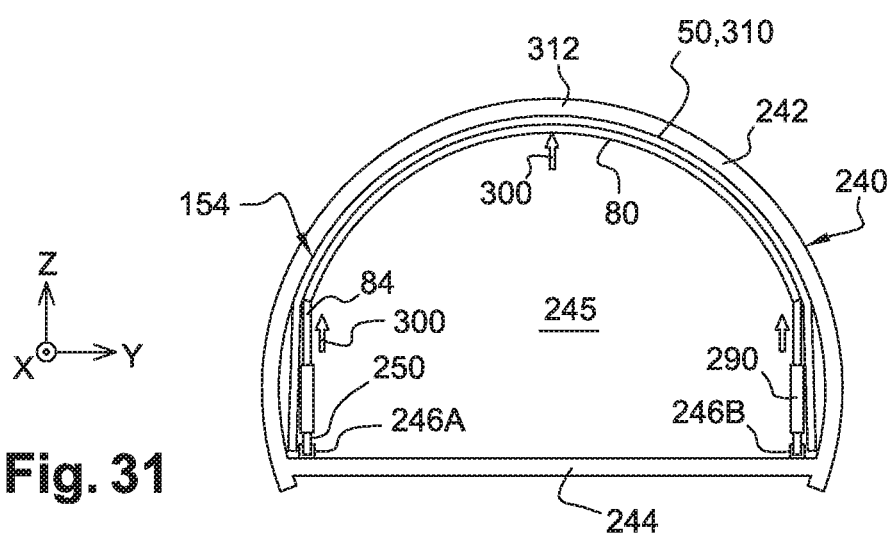
FIG. 31 is a similar view to FIG. 29, showing the step of raising the load-bearing structure of the thermoacoustic insulation module.

The method next comprises a step of lifting the load-bearing structure 140 (arrow 300) by means of the lifting cylinders 290 (FIG. 30), in such a way as to move a top part 310 of the mat 50 closer to a top part 312 of the aircraft structure 240 (FIG. 31). The top part 310 is the part resting on the bent battens 80.

The method next comprises a step of detaching the mat 50 from the load-bearing structure 140 and a step of attaching the mat 50 to the aircraft structure 240.

Figure 32:
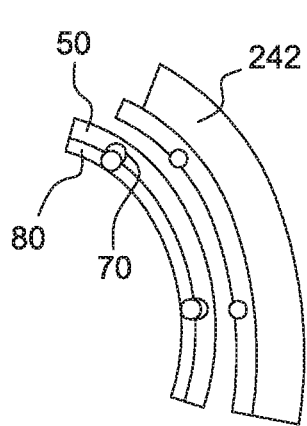
FIGS. 32 to 34 are partial schematic views, in cross section according to the plane S of FIG. 26, of the aircraft structure and the thermoacoustic insulation module, showing a step of detaching the mat from the load-bearing structure and a step of attaching the mat to the aircraft structure.
Figure 33:
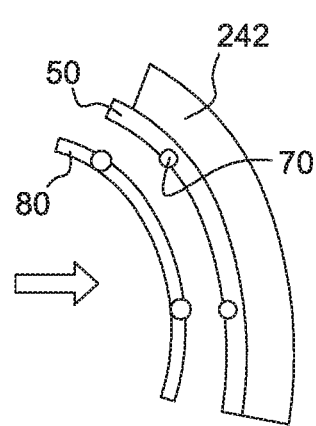

The mat is detached, as shown in FIG. 32, by releasing the attachment provided by the reversible attachment devices 70. In this case, this involves separating the loop parts and the hook parts of the hook and loop devices.

Figure 34:
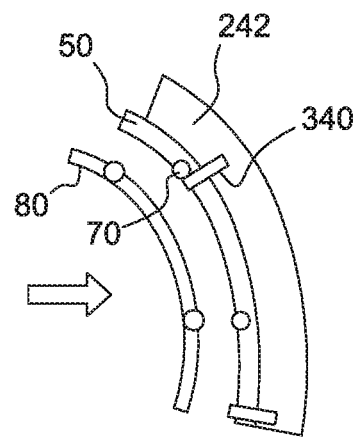

The mat 50 is then applied to the aircraft structure 240, in this case to respective lugs of the circumferential fuselage frames 242 (FIG. 33), then attached to the structure 240, for example by means of elastic clips 340 (FIG. 34).

Figure 35:
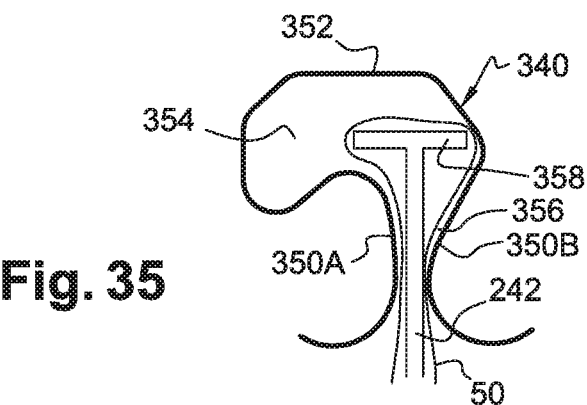
FIG. 35 is a schematic cross-sectional view of an elastic clip attaching the mat to the aircraft structure.

FIG. 35 shows an example of such an elastic clip 340, comprising two tabs 350A, 350B connected by a head 352 and defining an expanded space 354 and a narrowed portion 356. Such a clip is installed by forcing the lug 358 of a circumferential frame 242 to pass through the narrowed portion 356, making use of the elastic nature of the tabs 350A, 350B, until the lug 358 reaches the expanded space 354, where it is retained by the tabs 350A, 350B.

Therefore, the elastic clips 340 each grip the mat 50 in combination with a corresponding circumferential frame lug.

The steps of detaching the mat 50 from the load-bearing structure 140 and attaching the mat 50 to the aircraft structure 240 can be implemented consecutively or concurrently.

In the first case, the whole of the mat 50 is detached from the load-bearing structure 140, then the whole of the mat 50 is attached to the aircraft structure 240, while in the second case, certain parts of the mat 50 are attached to the aircraft structure while other parts of the mat are still attached to the load-bearing structure 140.

The method then comprises a step of removing the load-bearing structure 140 from the aircraft portion 245.

The load-bearing structure can then be retracted in order to be stored with a view to being reused to install another mat in another aircraft portion, using a similar method.

Figure 36:
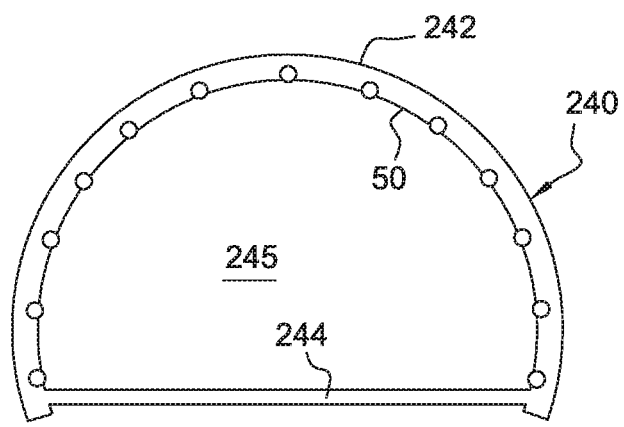
FIG. 36 is a similar view to FIG. 29, showing the aircraft structure equipped with the mat, after removing the load-bearing structure.

FIG. 36 shows the aircraft structure 240 equipped with the mat 50, upon completion of the thermoacoustic insulation method described above.

Naturally, in the variants in which the load-bearing structure 140 is not attached to the mat in a detachable manner, the load-bearing structure remains as an integral part of the aircraft, and the method does not comprise the step of removing the load-bearing structure.

Moreover, in the variants in which the load-bearing structure is not deployable, the insulation method does not comprise the deployment step.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a thermoacoustic insulation module for an aircraft, comprising:
   providing a mat configured to provide thermoacoustic insulation of an aircraft portion; followed by
   attaching a bendable structure to the mat; followed by
   bending the bendable structure, along a bending axis parallel to a longitudinal direction of the mat, such that the bendable structure forms a load-bearing structure supporting the mat in a curved shape, the load-bearing structure and the mat together forming said thermoacoustic insulation module.

2. The method according to claim 1, wherein the step of providing the mat comprises:
   providing a raw mat; followed by
   producing the mat from the raw mat, comprising the production of at least one of
   a plurality of porthole openings or
   at least one aircraft cabin door opening in the raw mat.

3. The method according to claim 2, wherein the step of providing the raw mat comprises a step of producing the raw mat comprising:
   depositing a first layer of thermoacoustic insulation on an outer film; followed by
   depositing a second layer of thermoacoustic insulation on one or more first areas of the first layer of thermoacoustic insulation, leaving one or more second areas of the first layer of thermoacoustic insulation not covered by the second layer of thermoacoustic insulation; followed by
   depositing an inner film on the second layer of thermoacoustic insulation and on the second areas of the first layer of thermoacoustic insulation.

4. The method according to claim 1, wherein the bendable structure comprises bendable battens, the step of attaching the bendable structure to the mat comprising a step of attaching the bendable battens to the mat such that the bendable battens are arranged in a transverse direction of the mat orthogonal to the longitudinal direction, and spaced apart from each other in the longitudinal direction.

5. The method according to claim 4, wherein the step of attaching the bendable structure to the mat comprises a step of attaching reversible attachment devices to the mat, followed by the step of attaching the bendable battens to the mat, using the reversible attachment devices.

6. The method according to claim 4, further comprising a step of attaching feet respectively to two opposing ends of each of the bendable battens, the feet being provided with at least one of wheels or lifting actuators.

7. The method according to claim 4, comprising, between the step of attaching the bendable battens to the mat and the step of bending the bendable structure, a step of compacting the mat that comprises:
   raising the segments of the mat, each situated between two corresponding consecutive bendable battens, such as to give the mat an undulated shape in the longitudinal direction; and
   bringing the segments closer together, and moving the bendable battens closer together, by compressing the segments, such as to reduce the space requirement of the mat in the longitudinal direction.

8. The method according to claim 7, further comprising a step of connecting the bendable battens to at least one synchronization device, connecting the bendable battens to each other in such a way as to synchronize the movements of the bendable battens relative to each other in the longitudinal direction.

9. The method according to claim 7, further comprising a step of installing a longitudinal retaining device configured to prevent the bendable battens from moving apart from each other in the longitudinal direction.

10. The method according to claim 1, further comprising a step of installing a transverse retaining device configured to hold the load-bearing structure in its bent shape.

* * * * *